United States Patent [19]
Sugden

[11] Patent Number: 5,894,211
[45] Date of Patent: Apr. 13, 1999

[54] ELECTRIC MACHINE

[75] Inventor: David Mark Sugden, W. Yorkshire, United Kingdom

[73] Assignee: Switched Reluctance Drives Limited, Harrogate, United Kingdom

[21] Appl. No.: 08/970,516

[22] Filed: Nov. 14, 1997

[30] Foreign Application Priority Data

Nov. 15, 1996 [GB] United Kingdom ............... 9623865

[51] Int. Cl.$^6$ ....................................... H02P 5/40
[52] U.S. Cl. .................. 318/701; 318/254; 318/759; 318/757
[58] Field of Search ................... 318/701, 138, 318/245, 254, 757, 439, 700, 696, 727; 180/197; 323/285, 351; 364/426.03; 322/94; 372/38, 25, 33, 92; 363/98, 17, 56, 132

[56] References Cited

U.S. PATENT DOCUMENTS

| | | | |
|---|---|---|---|
| 4,500,824 | 2/1985 | Miller | 318/701 |
| 5,075,610 | 12/1991 | Harris | 318/701 |
| 5,252,907 | 10/1993 | Harris et al. | 323/285 |
| 5,280,421 | 1/1994 | De Doncker et al. | 363/98 |
| 5,287,372 | 2/1994 | Ortiz | 372/38 |
| 5,381,081 | 1/1995 | Radun | 322/94 |
| 5,433,283 | 7/1995 | Shultz et al. | 180/197 |
| 5,489,831 | 2/1996 | Harris | 318/701 |
| 5,539,293 | 7/1996 | Randall et al. | |
| 5,736,828 | 4/1998 | Turner et al. | 318/701 |
| 5,742,146 | 4/1998 | Langhorst | 318/701 |

FOREIGN PATENT DOCUMENTS

| | | |
|---|---|---|
| 0 534 761 B1 | 3/1993 | European Pat. Off. . |
| 0 630 097 A2 | 12/1994 | European Pat. Off. . |

OTHER PUBLICATIONS

IEEE Transaction on Industrial Electronics, vol. 38, No. 5, Oct. 1991. "A Current–Controlled Quasi–Resonant Converter for Switched–Reluctance Motor" by Hoang Le–Huy.

"A Current–Controlled Quasi–Resonant Converter for Switched–Reluctance Motor", by Hoang Le–Huy, Karim Slimani and Phillippe Viarouge, *IEEE Transactions on Industrial Electronics*, vol. 38, No. 5, Oct. 1991, pp. 355–362.

Stephenson, Dr. J.M., et al., "The Characteristics, Design and Applications of Switched Reluctance Motors and Drives,"PCIM '93, Nurnberg, Germany 1993, Jun. 21–24, 1993 Conference & Exhibition, Seminar 5, pp. 1–68.

Ghausi, M.S., "Electronic Devices and Circuits, Discrete and Integrated," University of California at Davis, CBS College Publishing, 1985, pp. 44–47.

*Primary Examiner*—Paul Ip
*Attorney, Agent, or Firm*—Patterson & Keough, P.A.

[57] ABSTRACT

An electric machine includes a rotor and a stator, a rotor position transducer being provided to detect the position of the rotor relative to the stator. Phase windings are sequentially energizable to drive the rotor. The rotor position transducer is powered by the energization of one or more windings thus removing the need for an additional power supply for the rotor position transducer.

11 Claims, 6 Drawing Sheets

ELECTRIC MACHINE

BACKGROUND OF THE INVENTION

1. Field of the Invention

The invention relates to an electric machine and in particular to a position detector for an electric machine. The invention is particularly, although not exclusively, applicable to switched reluctance (SR) machines.

2. Description of Related Art

The general theory of design and operation of switched reluctance machines is well known. It is discussed, for example, in "The Characteristics, Design and Applications of Switched Reluctance Motors and Drives" by Stephenson & Blake, presented at the PCIM '93 Conference and Exhibition at Nürnberg, Germany, Jun. 21–24, 1993, and incorporated by reference herein in its entirety.

The switched reluctance drive is a variable-speed drive system comprising a switched reluctance machine supplied from a power-electronic converter under the control of low-power control electronics. The motor has salient poles on both the stator and the rotor, typically with an excitation coil around each stator pole. These stator coils are grouped to form one or more phase windings. The electrical currents in the windings are typically switched on and off by power-electronic switches. It will be appreciated that the reluctance machine can be operated equally well as a motor or a generator.

Figure 1:
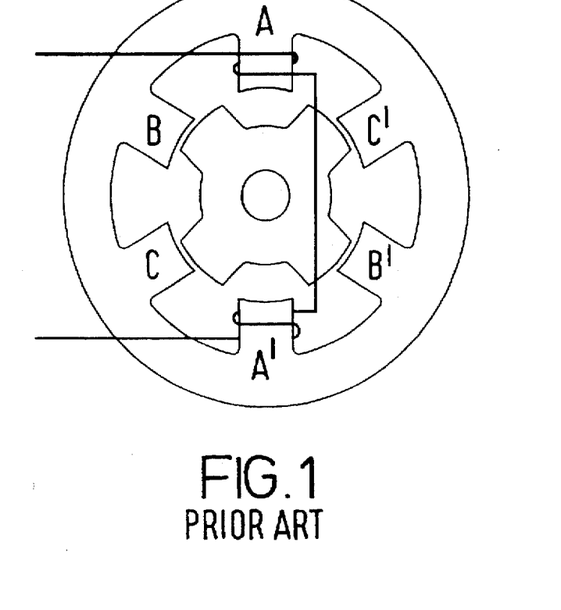
FIG. 1 shows a schematic view of a typical, 3-phase switched reluctance machine.

FIG. 1 shows a schematic diagram of a typical 3-phase SR machine, which has six stator poles and four rotor poles. The radially opposed poles carrying windings A and A' (phase A) have opposite magnetic polarization determined by the arrangement of the windings. Phases B and C are formed similarly.

The timing of the switching of the currents in the windings is controlled according to the relative angular positions of the stator and rotor poles. This relative position may be detected by a rotor position transducer (RPT) consisting of a rotating member and stationary sensors which supply signals to the control electronics. Those skilled in the art will recognize that there are many known forms of RPT, including, e.g., that shown in European Patent No. 630097, which is incorporated herein by reference.

Figure 2:
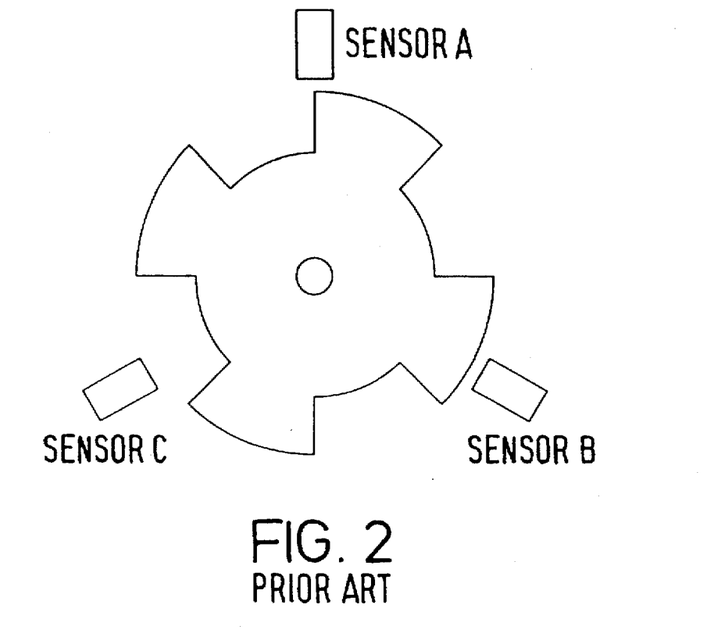
FIG. 2 shows a prior art rotor position transducer for a switched reluctance machine.

The RPT is used to ensure that the currents of the phase windings are switched on and off at the appropriate angles of rotation. FIG. 2 illustrates a typical system consisting of a rotating slotted disc and three optical sensors which are switched by the rotation of the disc. The RPT typically consists of a vane on the rotor which interrupts one or more slotted optical switches each comprising a light emitting diode (LED) and a phototransistor. Typically, it is necessary to supply the LED with current of the order of 10–20 mA in order for the slotted switch to operate.

Figure 3:
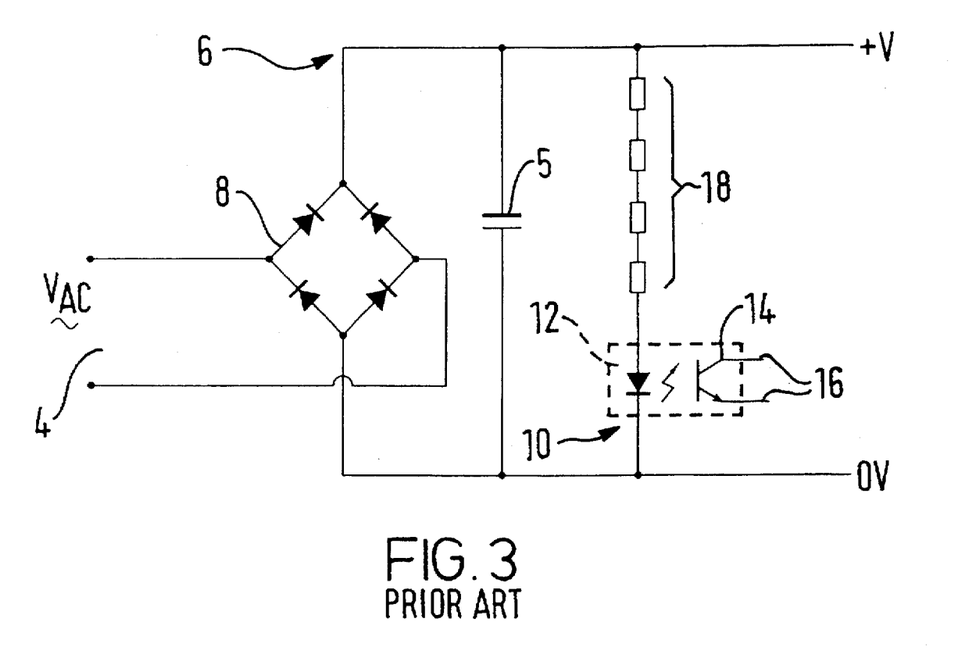
FIG. 3 shows a conventional supply for a slotted optical switch.

FIG. 3 shows part of a typical converter circuit for a switched reluctance machine. The rectifier bridge 8 supplies the dc link 6 from a single-phase alternating current supply 4. A dc link capacitor 5 acts to smooth the voltage of the dc link.

One known arrangement for supplying current to the LED is also shown in FIG. 3. The arrangement shown is of the "resistive dropper" type commonly used in drives which are designed for cost-sensitive applications such as washing machines, vacuum cleaners, dishwashers etc. A slotted optical switch is shown generally at 10 and includes an LED 12 and a cooperating phototransistor 14. The phototransistor 14 outputs a signal along lines 16 to a control system of any suitable known type to control the switching of the currents in the windings according to the RPT signal. The LED 12 supply current is provided by a resistor, or plurality of resistors 18, connected in series to the DC bus.

In systems designed for $120V_{AC}$ utility supplies, the provision of 20 mA of LED current causes a nominal dissipation in the resistors 18 of over 3 W. In systems designed for $230V_{AC}$ supplies, the nominal dissipation rises to over 6 W. Provision of a 3 W or 6 W rated resistor uses valuable printed circuit board area and adds to the heat-dissipation requirement of the electronics system. Furthermore, especially in domestic applications, such systems are generally required to operate over a wide supply range, varying between for example $100V_{AC}$ and $132V_{AC}$. When the (fixed) resistors 18 are used to derive the LED 12 current, the magnitude of the current can vary significantly from the optimum. In fact it is often necessary to use a conventional power resistor having a significantly higher power rating in order to achieve certification as to the flammability of a product in the domestic appliance market, thus further adding to cost. It will be seen, therefore, that various problems arise in conventional power-supply arrangements for the optical switch 10.

SUMMARY OF THE INVENTION

It is an object of the present invention to avoid or at least mitigate some if not all of the problems set out above.

According to embodiments of the invention there is provided an electric machine comprising a stator part and a moving part, current energizable means being provided on one or the other part energizable to drive the moving part relative to the stator part, and an additional current driven component, wherein the current driven component is provided in a common current path with the current energizable means. The current driven component may comprise an element, or all, of a position sensor for sensing the position of the moving part relative to the stator part.

As a result a dedicated independent supply is not required for the position sensor.

The electric machine may comprise a first voltage setting means in a common current path with the current energizable means for setting a substantially constant voltage across the current driven portion of the sensor. As a result, variations in the main power supply rating do not affect the position sensor, hence enabling reduced power dissipation and allowing correspondingly lower power rated resistors to be used. A second voltage setting means, for example a capacitor or a capacitor and a resistor in series, may be provided in parallel with the first voltage setting means. The first voltage setting means may comprise a zener diode. The zener diode, when conducting, provides a constant reference voltage for the position sensor. When the zener diode is off, the capacitor substantially maintains the constant voltage until the zener diode conducts again.

The electric machine may comprise a multi-phase electric machine having respective current energizable means associated with each phase, wherein the current drivable component of the position sensor is provided in a common current path with each current energizable means. As a result the position sensor is energized by successive phases, allowing use of a capacitor of reduced value.

According to a further embodiment of the invention there is provided a method of providing current to a current drivable component in an electric machine, the electric machine comprising a stator part and a moving part and current energizable means associated with one or the other parts energizable to drive the moving part relative to the stator part. The current drivable component may comprise all or part of a position sensor for sensing the position of the moving part relative to the stator part. The method may comprise switching the current energizable means to a freewheeling state and switching a portion of the freewheeling current to the current drivable means. As a result a portion of the stored energy in the energizable means—for example a motor winding—is used. The method steps may be carried out during an initial start-up phase of the machine.

BRIEF DESCRIPTION OF THE DRAWINGS

Embodiments of the invention will now be described, by way of example, with reference to the accompanying drawings in which:

FIG. 7b shows the zener diode current profile corresponding to FIG. 7a;

DETAILED DESCRIPTION OF PREFERRED EMBODIMENTS

The present invention solves the problems associated with prior art arrangements by using a proportion of the stored energy in the motor winding that would either circulate in the free wheel loop or return to the DC bus during the energy return phase of operation of an SR machine to power the LED.

Figure 4:
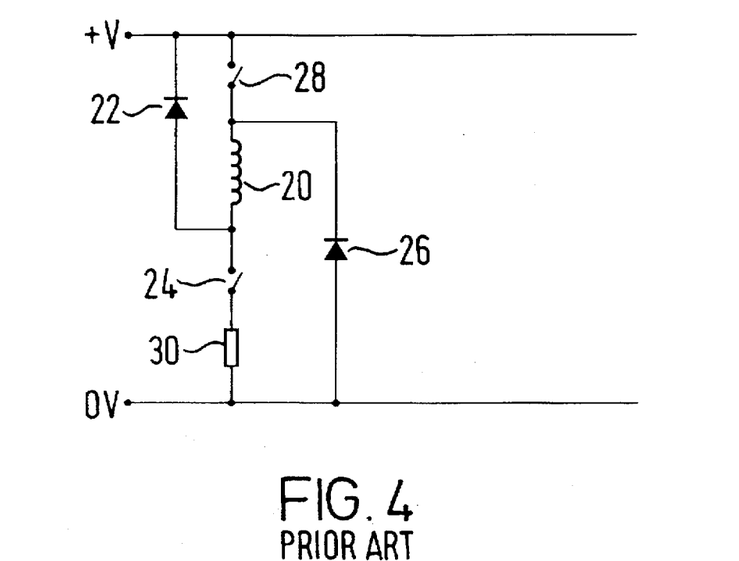
FIG. 4 shows a conventional power converter circuit for one phase of a switched reluctance drive.

FIG. 4 shows a conventional "two switch per phase" power converter circuit for one phase winding 20 of a switched reluctance motor. The circuit comprises the phase winding 20 in series with a "top" switch 28 and a "bottom" switch 24 connected across the dc link. A current measurement resistor 30 may be included, typically adjacent to the OV rail, to provide a low-cost method for measuring current. Diodes 22 and 26 are connected between the ends of the phase winding and the opposite rail of the DC link. When both switches 28 and 24 are closed, voltage is applied to the phase winding. Flux, which is the time integral of the applied voltage, begins to increase in the magnetic circuit associated with the phase winding, and current is drawn from the supply to support this flux. If both switches are opened together, the current continues to flow, but now through the diodes and back to the dc link. The action of the diodes is to reverse the voltage across the winding, so the flux (and hence the current) decay to zero. This decay is commonly referred to as the "energy return" part of the cycle.

If, however, one switch (say 28) is opened ahead of the other, the only voltage applied across the winding is that comprising the resistive voltage drop across the winding and resistor 30 and the conduction voltage drop in the switch 24 and diode 26. Since this voltage is small, the flux decays very slowly and hence the current also decays slowly as it circulates around the loop formed by the winding 20, switch 24, resistor 30 and diode 26. This circulation is commonly referred to as "free wheeling" and can be used for a variety of reasons, including control flexibility, acoustic noise reduction, etc. all as known in the art. Switches 24, 28 can, for example, be power transistors, such as bipolar transistors, insulated gate field effect transistors, power metal oxide silicon field effect transistors, etc., controlled by any one of a large number of known methods.

Figure 5:
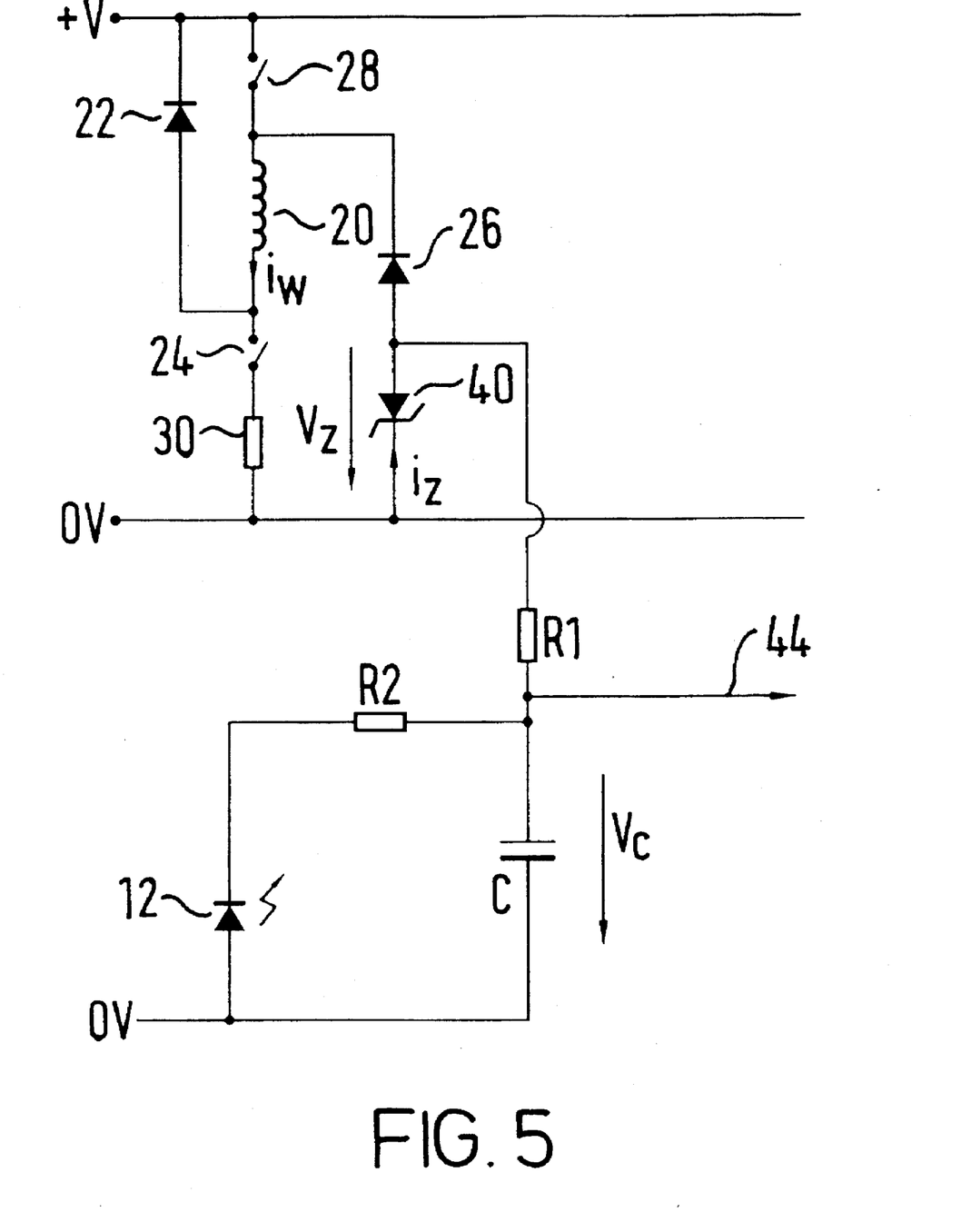
FIG. 5 shows a power converter circuit according to an embodiment of the present invention.

FIG. 5 shows a power converter circuit according to an embodiment of the invention in which components additional to FIG. 4 have been incorporated to provide a power supply for the LED 12.

Figure 6A:
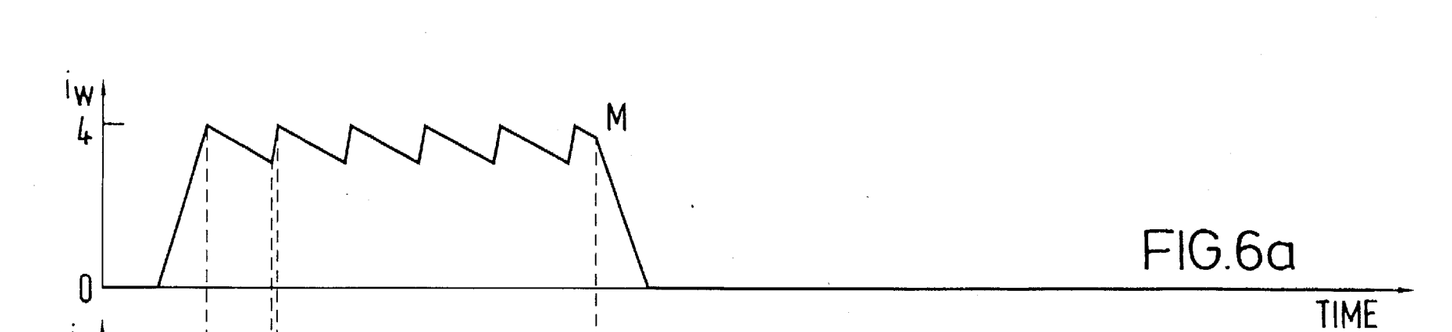
FIG. 6a shows a typical winding current profile for one phase of a switched reluctance machine when the machine is in the chopping mode.

Referring to FIG. 6a, a typical winding current profile obtainable using the circuit of FIG. 4 for the phase winding 20 is shown. In a first step, the winding 20 is energized rapidly to the value, for example, of 4 A by closing both switches 24 and 28 to establish a direct current path through the winding 20 from the positive voltage line to the zero volt line. As can be seen from FIG. 6a the current, $i_w$, rises rapidly to the 4 A value. In order to approximate a square pulse of current, the current is then "chopped". The chopping operation comprises repeatedly opening and closing one or other of the switches 24, 28—for example switch 28. When the switch 28 is open, current flowing in the winding 20 continues to circulate in the freewheeling path through the closed switch 24 and the diode 26 in a "zero voltage" loop. As can be seen from the current curve in FIG. 6a the current $i_w$ decays slowly. When the switch 28 is closed once again the current rises rapidly to the previous 4 A value at which point the switch 28 is opened once more. It can be seen that by repeating these steps the profile shown in FIG. 6a is achieved. This chopping operation allows the current to be maintained at an average level for a desired period of time during which the winding 20 is energized. To de-energize the winding 20, both switches 24 and 28 are opened and the current is compelled to flow through both diodes 22, 26 and decays rapidly, returning the energy to the supply.

Referring now to FIG. 5, the circuit according to an embodiment of the present invention allows a proportion of the energy in the winding 20 to power the LED 12 during energy return of freewheeling portions of the cycle. Where appropriate, similar reference numerals have been used as in FIG. 4. In addition to the LED 12, the circuit includes various additional components as described in more detail below connected between the second diode 26 and the zero volt line.

The additional components include a zener diode 40 (in this example, rated at 5V) connected between the second diode 26 and the zero volt supply line. Also connected between the second diode 26 and the zero volt supply line, in parallel with the zener diode 40, is a series combination of a resistor R1 (in this example 10 ohms) and a capacitor C. The LED 12 and a resistor R2 (in this example 220 ohms) in series therewith are also connected between resistor R1 and the zero volt supply line in parallel with the capacitor C. The value of the capacitor C in this example is 1000 μF.

In operation, when both switches 24, 28 are closed and current in the winding 20 rises rapidly, diode 26 prevents current from flowing through the LED and associated components. When switch 28 is opened, the current flows in the freewheeling state through resistor 30 and diode 26. The zener diode 40 is reverse biased and thus holds the voltage at a point between the zener diode 40 and the second diode 26 at the constant value, in the present example 5V. Capacitor C is thus charged to that value through resistor R1 and current simultaneously runs through LED 12 via resistors R1 and R2 such that the LED 12 operates at the desired current level. When switch 28 is closed once again the current through the zener diode 40 and diode 26 drops to zero. The capacitor C, however, acts as a holdup capacitor which partially discharges across the LED 12 and maintains the LED current.

Figure 6B:
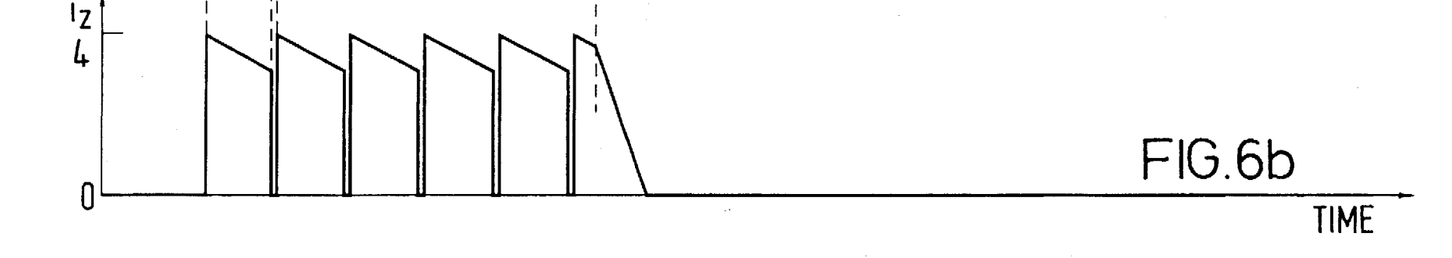
FIG. 6b shows the current profile for a zener diode corresponding to the winding current of FIG. 6a in an embodiment of the invention.
Figures 6C, 6D:
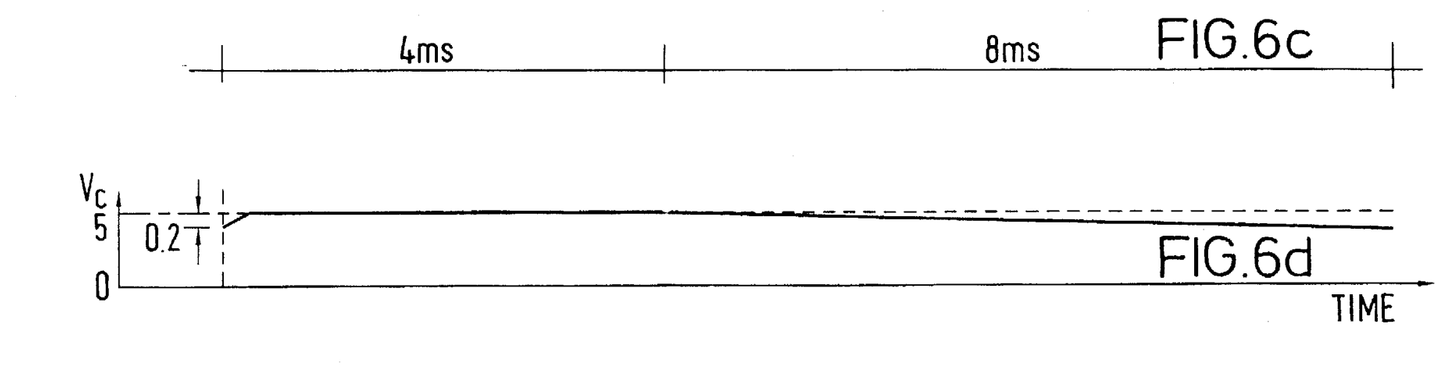
FIG. 6c shows the time scale for the current profiles of FIGS. 6a and 6b.
FIG. 6d shows the LED supply voltage.

Operation of the circuit can be best understood from the waveforms shown in FIGS. 6b to 6d, where, as discussed above, the winding current profile is shown in FIG. 6a. The corresponding zener diode current, $i_z$, is shown in FIG. 6b. For the sake of illustration, it is assumed that the zener diode is ideal (i.e., it has no leakage current) and the capacitor is ideal. When both switches 24, 28 are closed and the winding current rises to 4 A, the zener diode current is zero. At the first chopping step when switch 28 is opened, the zener diode current jumps to 4 A and then decays slowly. The zener diode current drops to zero when the switch 28 is closed once again and the winding current rises, and the pattern repeats at the next chopping step. When both switches 24, 28 are opened, at point M, the current through the winding 20 begins to decay rapidly through diodes 22 and 26 and the zener diode.

The on-off period of the winding current pulse is shown in the example of FIG. 6 as being on for 4 ms and off for 8 ms so that the zener diode 40 conducts for almost ⅓ of the time. The corresponding LED supply voltage, $V_c$, is shown in FIG. 6d. As can be seen, the LED supply voltage is maintained substantially at the maximum value of 5V while the winding is energized, the holdup capacitor C maintaining the LED supply voltage when the zener diode current drops to zero briefly during chopping. When the winding 20 is de-energized and the zener diode current drops to zero, the LED supply voltage decays only slowly because of the capacitor C. For example, where a value of 1000 μF is used for the capacitor, the supply voltage drops by approximately 0.2V before the winding is energized again. It will be seen, therefore, that once the motor is in operation, the LED supply voltage is maintained at substantially 5V.

It will be understood by the skilled person that the main function of resistor R1 in FIG. 5 is to limit the initial surge of current into the capacitor. If the capacitor is of sufficient rating, then R1 may be omitted. However it will generally be found that the incorporation of R1 is cost-effective in that it allows a significant reduction in the cost of the capacitor.

On start-up of the motor, to prime the system and provide current to the LED 12 before the motor begins to operate, it is necessary to energize the motor winding 20. Various arrangements are known for priming the system. For example, referring to U.S. Pat. No. 5,539,293, which is incorporated herein by reference, in systems employing a coded position sensor arrangement a starting sequence is used to locate the rotor in a known position by energizing selected stator poles to orient the rotor into the predetermined position. The energizing current used in such systems can be used to provide current to the LED 12 before the motor begins operation. Alternatively, the winding 20 can be energized with a low level of current which produces negligible torque in the motor. Once the priming sequence has established the required current to the LED 12, the motor can operate conventionally, the current to the LED 12 being maintained by periodically topping up the reservoir capacitor each time the winding is being de-energized as discussed above. The system can also be used to provide a negative supply voltage (as a result of the bias of the zener diode) for any circuit that may require it, for example, analog comparators. The connection 44 in FIG. 5 shows where such other circuits could be connected.

Figure 7A:
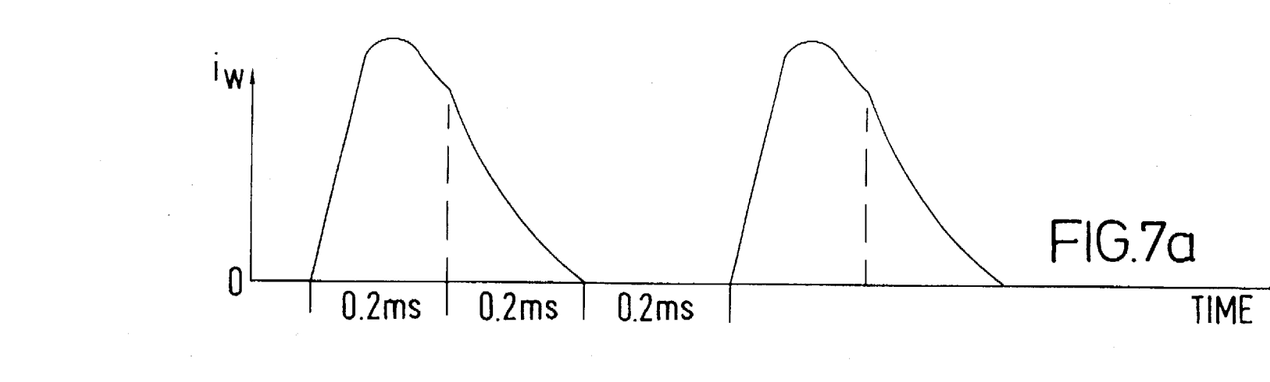
FIG. 7a shows a typical winding current profile for one phase of a switched reluctance machine when the machine is in the single-phase mode.
Figure 7B:
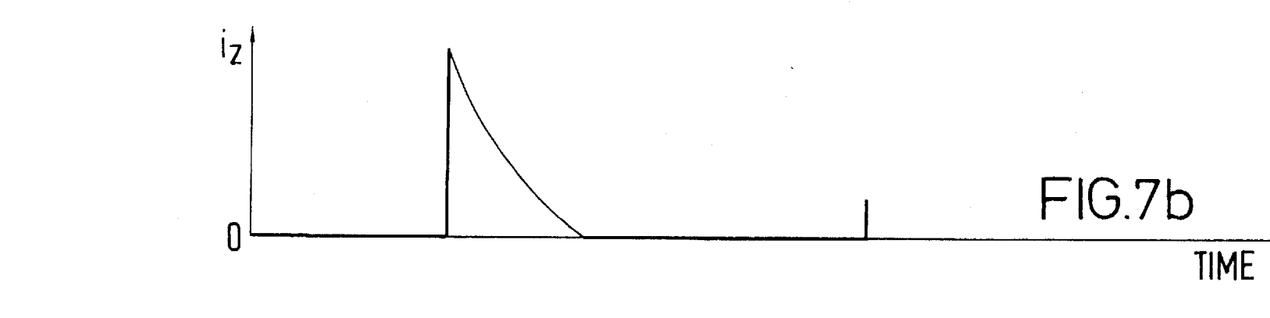
Figure 7C:
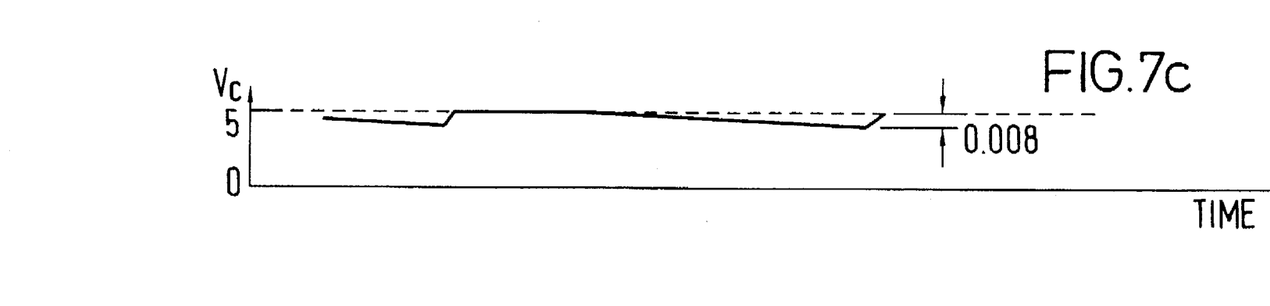
FIG. 7c shows the LED supply voltage.

The winding current profile shown in FIG. 6a is typical, for example, of a washing machine drive operating at medium speed, e.g., in wash mode. FIGS. 7a to 7c show operation at high speed, in which the zener diode 40 conducts for approximately 33% of the time. Once again when both switches 24, 28 are closed, energizing the winding 20 as shown in FIG. 7a, the zener diode current, $i_z$, shown in FIG. 7b remains at zero. In this mode no chopping takes place and switches 24, 28 are simply opened again once the desired rotor position is reached and the winding current decays to zero once more. In the embodiment shown, the winding is energized for approximately 0.2 ms and the current decays to zero once more in an equal period of 0.2 ms. The winding current remains at zero for a further 0.2 ms before the winding 20 is re-energized. As can be seen from FIG. 7b the zener diode current switches on after 0.2 ms and decays with the winding current back down to zero after a further 0.2 ms. The zener diode voltage is maintained at a constant 5V while current flows in the zener diode. Referring to FIG. 7c the LED supply voltage ($V_c$) is maintained at 5V while current flows through the zener diode 40 and decays slowly when the zener diode current is zero because of the capacitor C until current flows once again through the zener diode 40. Once again for a capacitance of 1000 μF, the voltage decays by approximately 8 mV while the zener diode current is zero, remaining therefore at a sufficient level to maintain suitable current flow through the LED 12.

While the operation of the circuits has been described in association with modes of control in which the current in the phase winding 20 falls to zero during its cycle, it is also possible to implement the invention on systems where the current does not fall to zero during the cycle, e.g. as described in European Patent No. 534761 B1, which is incorporated by reference herein.

Figure 8:
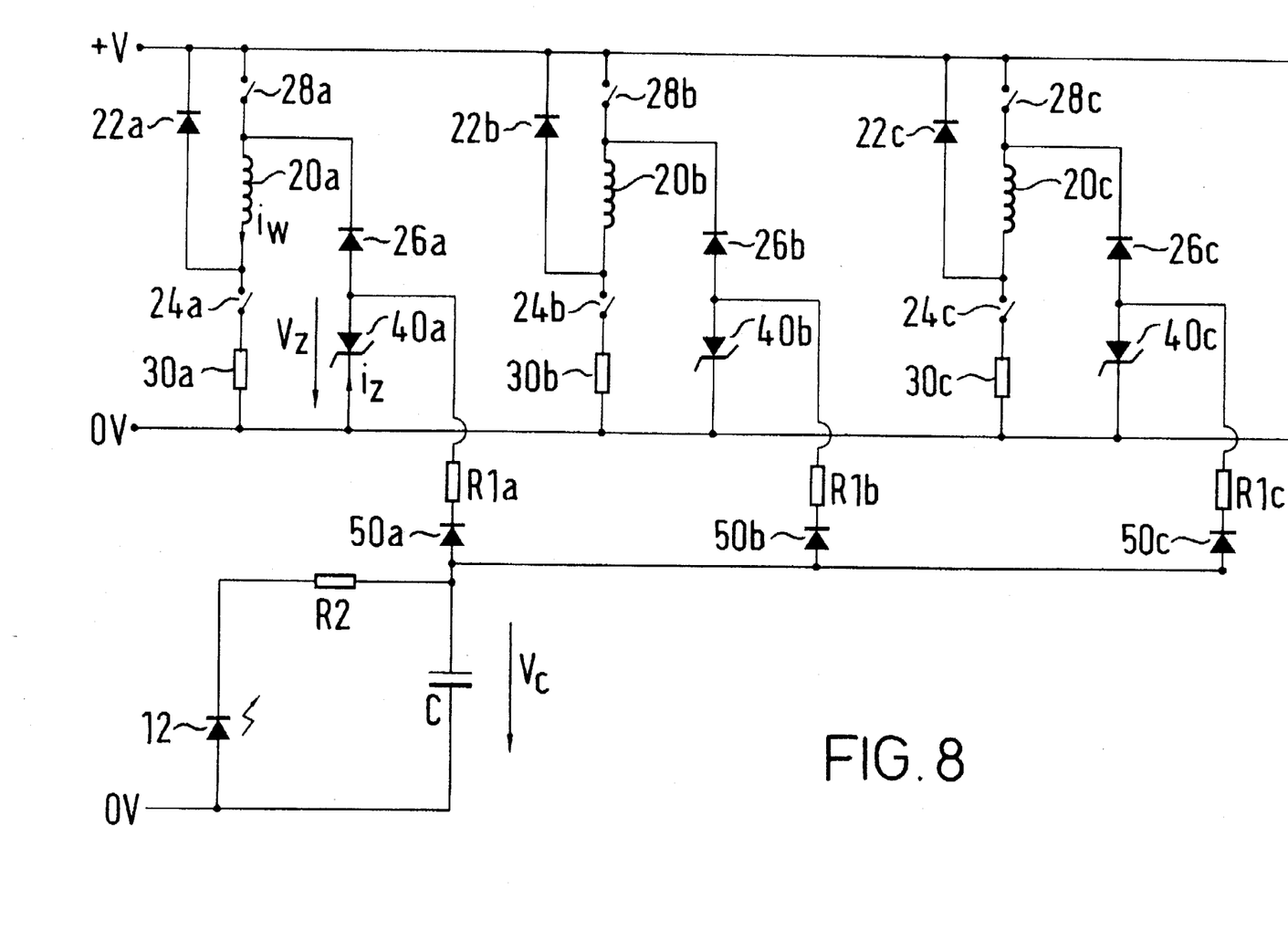
FIG. 8 shows a power converter circuit according to another embodiment of the present invention.

The value of the holdup capacitor C can be reduced using the circuit shown in FIG. 8. A 3-phase motor is shown including windings 20a, 20b and 20c. In addition to respective conventional components (diodes 22a,b,c and 26a,b,c, switches 24a,b,c and 28a,b,c and resistors 30a,b,c corresponding to the arrangement shown in FIG. 4), each winding 20a,b,c is also associated with a respective zener diode 40a,b,c and resistor R1a,b,c. Each of the phases is connected via R1 to a common LED 12, resistor R2 and parallel capacitor C such that the current in each winding 20a,b,c is used in turn to power the LED 12. As a result, the capacitor C need only be of a high enough value to maintain the LED 12 at a suitable voltage during chopping in each phase and need not sustain a suitable voltage for the time during which a given phase is off. Of course this system is achieved at the expense of additional components such as the zener diodes 40b,c and the resistors R1b,c. Further diodes 50a,b,c are connected between each resistor R1a,b,c and the resistor R2 and capacitor C to prevent current flow between windings 20a,b,c.

It will be appreciated that while the above system has been discussed with reference to a switched reluctance motor it would be equally appropriate for a generator or indeed any suitable electric machine having energizable windings and requiring a power supply for another circuit.

It will further be appreciated that the zener diode 40 and capacitor C arrangement discussed above could be replaced by any appropriate circuitry. The particular effect of the zener diode 40 is that it maintains constant the voltage across the LED 12 and resistors R1 and R2, allowing controllable constant current flow through the LED 12. The particular effect of the capacitor C is that of holding the voltage substantially constant at these times where the zener diode 40 is off.

While the invention has been described in connection with the illustrative embodiments discussed above, those skilled in the art will recognize that many variations may be made without departing from the present invention. For example, the present invention is applicable to inverted machines in which the stator is in the center of the machine and the rotor is arranged to rotate around the outside of the stator. Also, the invention is applicable to linear machines as well as rotary ones. The term rotor is often used in relation to linear machines to describe the moving member. The term rotor used herein is intended to embrace such moving members of linear machines.

Although the above discussion relates to the provision of current to an LED in a RPT, it will be appreciated that other current drivable components could be driven using a proportion of the stored energy in the motor winding.

Accordingly, the above description of several embodiments is made by way of example and not for the purposes of limitation. The present invention is intended to be limited only by the scope of the following claims.

What is claimed:

1. A control circuit for an electric machine including a stator part and a moving part, the control circuit comprising:
    at least one winding for driving the moving part relative to the stator part;
    a current-driven component connected in a common current path with the winding to provide a proportion of the energy in the winding to power the current-driven component;
    first voltage setting means for setting a substantially constant voltage across the current-driven component; and
    at least one additional voltage setting means for setting a voltage, the additional voltage setting means connected in parallel with the first voltage setting means.

2. A control circuit as claimed in claim 1 in which the current driven component comprises all or an element of a position sensor for sensing the position of the moving part relative to the stator part.

3. A control circuit as claimed in claim 1 in which the first voltage setting means comprises a zener diode.

4. A control circuit as claimed in claim 1 in which the additional voltage setting means comprises a capacitor or a capacitor and resistor in series, or a capacitor and resistor and diode in series.

5. A control circuit as claimed in claim 1, wherein the control circuit is for a multi-phase electric machine, the control circuit having a respective winding for driving the moving part relative to the stator part associated with each phase, wherein the current driven component is provided in a common current path with each winding.

6. A method of providing current by a control circuit to a current drivable component in an electric machine, the electric machine comprising a stator part and a moving part, the method comprising the steps of:
    driving the moving part relative to the stator part by energizing a winding;
    providing a proportion of the energy in the winding to power the current-drivable component, the current-drivable component being in a common current path with the winding;
    setting a substantially constant voltage across the current-drivable component with first voltage setting means;
    setting a voltage with at least one additional voltage setting means connected in parallel with the first voltage setting means; and
    driving the current drivable component by passing current through the winding.

7. A method as claimed in claim 6 in which the current drivable component comprises all or an element of a position sensor for sensing the position of the moving part relative to the stator part.

8. A method as claimed in claim 6 further comprising switching the winding to a freewheeling state and using a portion of the freewheeling current for the current drivable means.

9. A method as claimed in claim 6 in which the method steps are carried out during an initial start-up phase of the machine.

10. A control circuit for an electric machine including a stator part and a moving part, the control circuit comprising:
    at least one winding for driving the moving part relative to the stator part;
    a rotor position transducer connected in a common current path with the winding to provide a proportion of t he energy in the winding to power the rotor position transducer;
    a first voltage setting arrangement for setting a substantially constant voltage across the rotor position transducer; and
    at least one additional voltage setting arrangement for setting a voltage, the additional voltage setting arrangement connected in parallel with the first voltage setting arrangement.

11. The control circuit of claim 10, wherein the first voltage setting arrangement comprises a zener diode for setting a substantially constant voltage across the rotor position transducer, further wherein the additional voltage setting arrangement comprises at least one of a capacitor, resistor and diode in series, the additional voltage setting arrangement being provided in parallel with the first voltage setting arrangement.

* * * * *